(12) United States Patent
Baker et al.

(10) Patent No.: US 6,874,695 B2
(45) Date of Patent: Apr. 5, 2005

(54) CONTROL SYSTEM FOR, AND A METHOD OF, HEATING AN OPERATOR STATION OF A WORK MACHINE

(75) Inventors: Thomas M. Baker, Peoria, IL (US); Brian D. Hoff, East Peoria, IL (US); Sivaprasad Akasam, Mossville, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/308,901

(22) Filed: Dec. 3, 2002

(65) Prior Publication Data

US 2004/0104280 A1 Jun. 3, 2004

(51) Int. Cl.⁷ ............................................... B60H 1/02
(52) U.S. Cl. ........................... 237/12.3 C; 237/12.3 B; 237/2 A; 165/41; 165/42
(58) Field of Search ....................... 237/12.3 C, 12.3 R; 165/41, 42

(56) References Cited

U.S. PATENT DOCUMENTS

| | | | | |
|---|---|---|---|---|
| 3,758,031 A | * | 9/1973 | Moran | 237/8 A |
| 4,280,330 A | * | 7/1981 | Harris et al. | 62/3.3 |
| 4,398,081 A | * | 8/1983 | Moad | 219/202 |
| 4,520,258 A | * | 5/1985 | Grohmann | 392/307 |
| 4,700,888 A | | 10/1987 | Samulak | |
| 5,063,513 A | * | 11/1991 | Shank et al. | 701/36 |
| 5,275,012 A | * | 1/1994 | Dage et al. | 62/208 |
| 5,350,114 A | * | 9/1994 | Nelson et al. | 237/2 A |
| 5,743,466 A | | 4/1998 | Humburg | |
| 5,963,020 A | | 10/1999 | Orr | |
| RE36,437 E | * | 12/1999 | Hanson et al. | 123/179.4 |
| 6,116,513 A | * | 9/2000 | Perhats, Sr. | 237/2 A |
| 6,167,658 B1 | * | 1/2001 | Weiner | 52/2.11 |
| 6,270,015 B1 | * | 8/2001 | Hirota | 237/12.3 B |

FOREIGN PATENT DOCUMENTS

| | | |
|---|---|---|
| DE | 27 12 438 A1 | 9/1978 |
| DE | 28 48 417 A1 | 5/1980 |
| EP | 1 038 701 A3 | 9/2000 |
| EP | 1 038 701 A2 | 9/2000 |
| EP | 0 891 885 B1 | 11/2002 |
| JP | 59 070208 A | 4/1984 |

* cited by examiner

Primary Examiner—Derek S. Boles
(74) Attorney, Agent, or Firm—Liell & McNeil

(57) ABSTRACT

There are situations in which an operator remains in an operator station of a work machine when an engine of the work machine is inactive. The present invention includes a control system for, and a method of, heating the operator station when the engine is inactive. A heating system of the work machine includes an electrically-powered coolant pump, a power source, and at least one piece of warmed machinery. An operator heat controller is moveable between a first and a second position, and is operable to connect the electrically-powered coolant pump to the power source when the engine is inactive and the operator heat controller is in the first position. Thus, by deactivating the engine and then moving the operator heat controller to the first position, the operator may supply electrical energy to the electrically-powered coolant pump, which is operably coupled to heat the operator station.

20 Claims, 4 Drawing Sheets

Fig_3_

CONTROL SYSTEM FOR, AND A METHOD OF, HEATING AN OPERATOR STATION OF A WORK MACHINE

GOVERNMENT RIGHTS

This invention was made with U.S. Government support under DOE contract DE-SC04-00AL66778 awarded by the Department of Energy. The Government has certain rights in this invention.

TECHNICAL FIELD

The present invention relates generally to work machines, and more specifically to control systems for heating an operator station within a work machine.

BACKGROUND

Work machines often include various auxiliary systems, including but not limited to, air conditioning systems, hydraulic systems and heating systems. These auxiliary systems are typically belt or gear driven systems powered by an engine. Thus, the speed at which the engine operates dictates the power delivered to the auxiliary system. Often, the engine is operating at speeds that produce and deliver more power than needed to the auxiliary systems, resulting in wasted energy.

However, engineers have developed electrically-powered auxiliary systems, such as the auxiliary systems shown in U.S. Pat. No. 5,963,020, issued to Orr, on Oct. 5, 1999. In the Orr work machine, mechanical power created by the engine is transferred to a generator system via a drive train. The generator system converts the mechanical power to electrical energy, and supplies the electrical energy to various auxiliary systems within the work machine. Unlike with the mechanically-powered auxiliary systems, the amount of energy supplied to the electrically-powered auxiliary systems can be controlled by the generator system. Therefore, electrically-powered auxiliary systems, such as the heating system, can often be operated more efficiently. Although the Orr method provides electrical energy on demand to auxiliary systems when the engine is operating, the method does not address providing electrical energy to the auxiliary systems when the engine is inactive.

There are situations in which it is desirable to operate an auxiliary system while the engine is inactive. For instance, over-the-road truck operators often spend the night in a cab of the truck during multiple-day trips. During cold weather, the operator will need to heat the cab overnight. Typically, the operators idle the engine to utilize the conventional heating system powered by the engine, or connect the truck to an auxiliary power unit, or shore power, to power an alternative heating system, such as an electric heater. When the engine is idling, the truck is consuming fuel and creating exhaust, resulting in a decrease of fuel economy and an increase in undesirable emissions. When using the alternative heating system, the auxiliary power unit must produce a considerable amount of electrical energy to operate the alternative heating system. Further, the operator may be required to exit the cab into the cold weather in order to connect the truck to the auxiliary power unit. Similarly, off-road work machine operators may also need to heat the cab while the engine is inactive. For instance, the operator often remains in the cab of the work machine while logging data or completing reports. Again, during cold weather, the operator will need to idle the engine or utilize the auxiliary power unit to power the alternative heating system.

The present invention is directed to overcoming one or more of the problems set forth above.

SUMMARY OF THE INVENTION

In one aspect of the present invention, a work machine includes an engine attached to a work machine body, an operator station and a heating system. The heating system includes an electrically-powered coolant pump, a power source, and at least one piece of warmed machinery. When the engine is inactive, an operator heat controller is operable to connect the electrically-powered coolant pump to the power source.

In another aspect of the present invention, there is a heating control system including an operator heat controller that is moveable between a first position and a second position. An electronic control module includes an operator station heating algorithm and is in communication with a power source and an electrically-powered coolant pump. When the operator heat controller is in the first position and an engine sensor is inactive, the operator station heating algorithm is operable to connect the electrically-powered coolant pump to the power source.

In yet another aspect of the present invention, an operator station of a work machine is heated by deactivating an engine and moving an operator heat controller to a first position. Electrical energy is supplied to an electrically-powered coolant pump while the engine is inactive.

DETAILED DESCRIPTION

Figure 1:
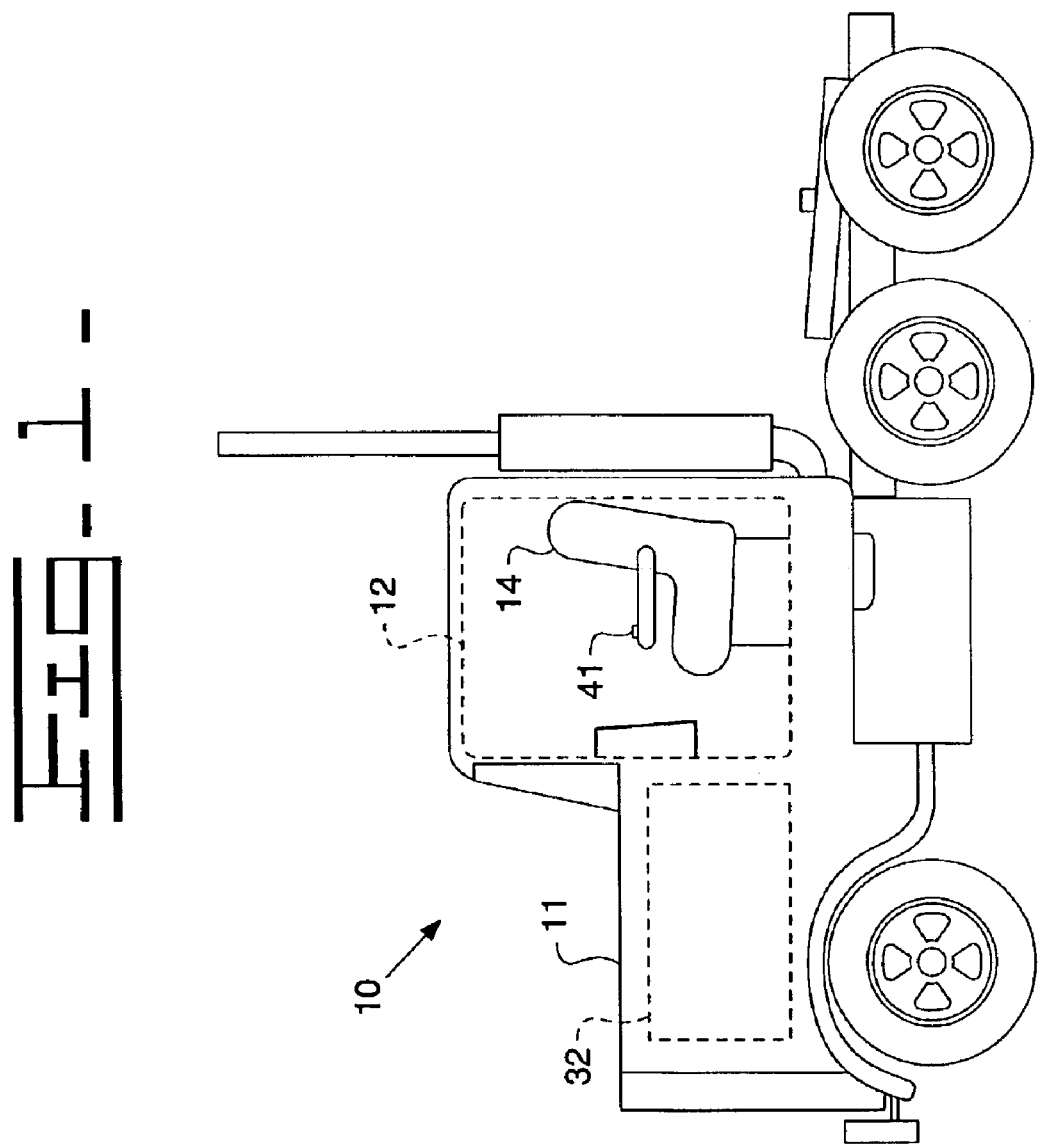
FIG. 1 is a side view of a work machine according to the present invention.

Referring to FIG. 1, there is shown a side view of a work machine 10, according to the present invention. The work machine 10 includes a work machine body 11 and an operator's station 12. Although the work machine 10 is illustrated as an over-the-road truck, the present invention contemplates use in various types and sizes of work machines, including off-road work machines, such as graders and excavators. Overall, the present invention may be utilized in any work machine in which there may be a need to heat the operator's station when an engine is inactive. It should be appreciated that although the operator's station 12 is illustrated as being an enclosed compartment, the operator's station 12 could include an open-aired station. The operator's station 12 preferably includes an operator's seat 14 to which an operator heat controller 40 is attached. However, it should be appreciated that an operator heat controller 40 could be positioned at various points within the operator's station 12, such as attached to a console. It should also be appreciated that the operator heat controller 40 could be any type of hand or foot controller, but preferably is a hand controller, such as a switch or a button.

Figure 2:
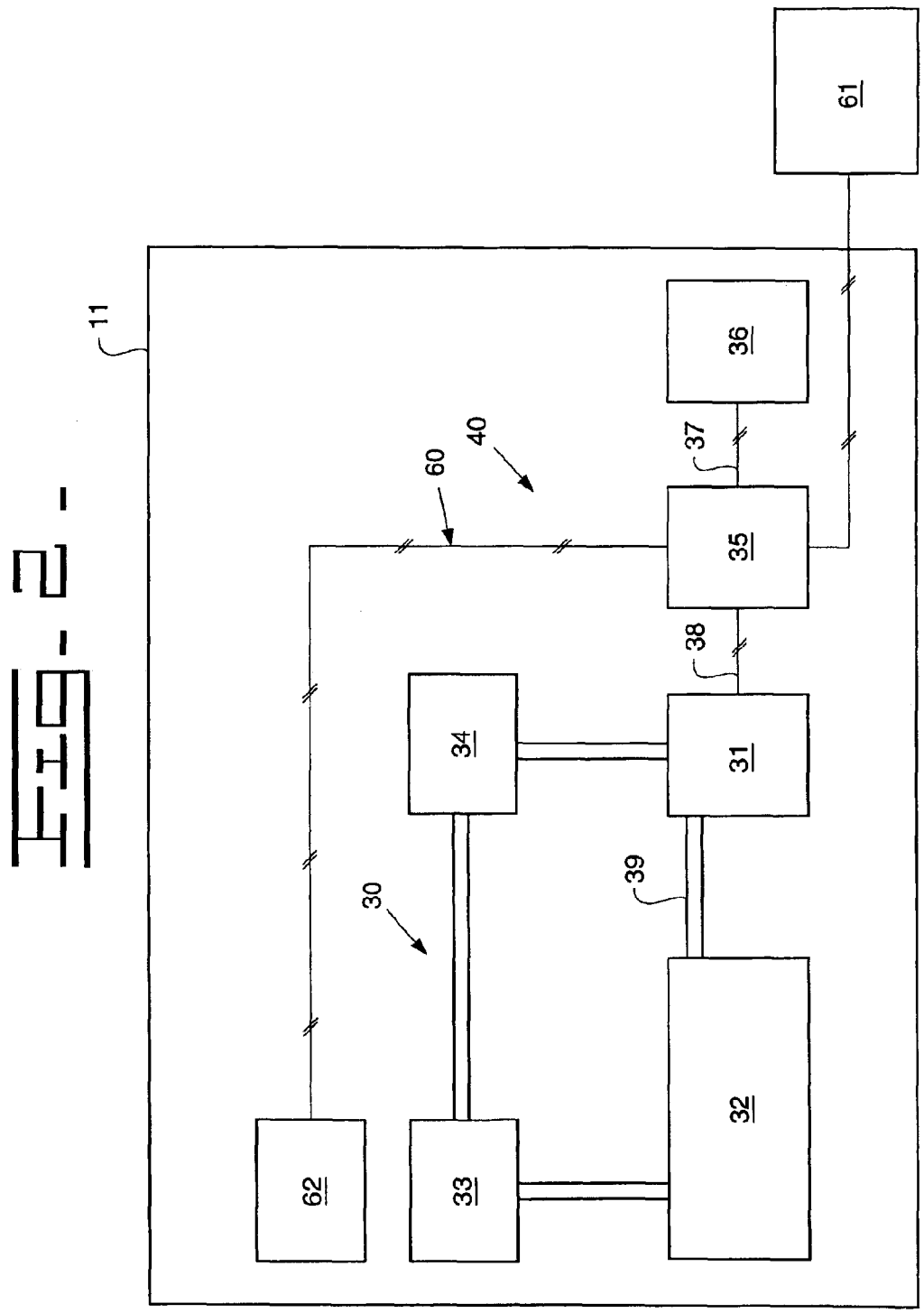
FIG. 2 is a schematic representation of a heating system in communication with a heating control system, both included within the work machine of FIG. 1.

Referring to FIG. 2, there is shown a heating system 30 in communication with a heating control system 40 included in the work machine 10 of FIG. 1. The heating system 30 includes an electrically-powered coolant pump 31, a source of coolant 34, a piece of warmed machinery 32 and, preferably, a heat exchanger 33, all in fluid communication via a fluid circuit 39. When activated, the electrically-powered coolant pump 31 pumps the coolant from the source of coolant 34 to a piece of warmed machinery 32. As the coolant passes over the warmed machinery 32, it absorbs the heat from the piece of warmed machinery 32. Although the piece of warmed machinery 32 is preferably at least a portion of an engine 32 attached to the work machine body 11, it should be appreciated that the warmed machinery 32 could also include other pieces of warmed work machinery that are cooled by coolant, including but not limited to, a transmission. The warmed coolant is delivered from the engine 32 to a heat exchanger 33. As the warmed coolant passes through the heat exchanger 33, the heat within the fluid is transferred to the air that is being blown through the heat exchanger 33. The heated air is blown into the operator's station 12. The coolant can then flow back to the source of coolant 34 in order to be recycled through the heating system 30.

A heating control system 40 includes an electronic control module 35 that is in communication with the electrically-controlled coolant pump 31 via a pump communication line 38, and in communication with a power source 36 via a power source communication line 37. Although there are various power sources that can supply electrical energy to the electrically-powered coolant pump 31 when the engine 32 is inactive, the power source 36 is preferably a battery. When the engine 32 is inactive, the battery 36 will supply electrical energy to the coolant pump via an electronic control module 35. Those skilled in the art will appreciate that when the engine 32 is active, the electrically-powered coolant pump 31 is supplied with electrical energy in a conventional manner. The electronic control module 35 is also preferably in communication with a second heating system 60. It should be appreciated that the second heating system 60 could be any conventional auxiliary heating system that is used to heat the operator's station 12 when the engine 32 is inactive. For instance, the present invention illustrates the second heating system 60 as including an auxiliary power unit 61 and an electric heater 62. The operator will connect the work machine 10 to the auxiliary power unit 61 when the work machine 10 is stationary and de-activated. The auxiliary power unit 61 is any unit that can supply electrical power to the electric heater 62 via the electronic control module 35. Although the auxiliary power unit 61 is illustrated as being included in a shore power hookup, which is detached from the work machine body 11, it should be appreciated that an auxiliary power unit, such as a second battery, could be attached to the work machine body 11.

Figure 3:
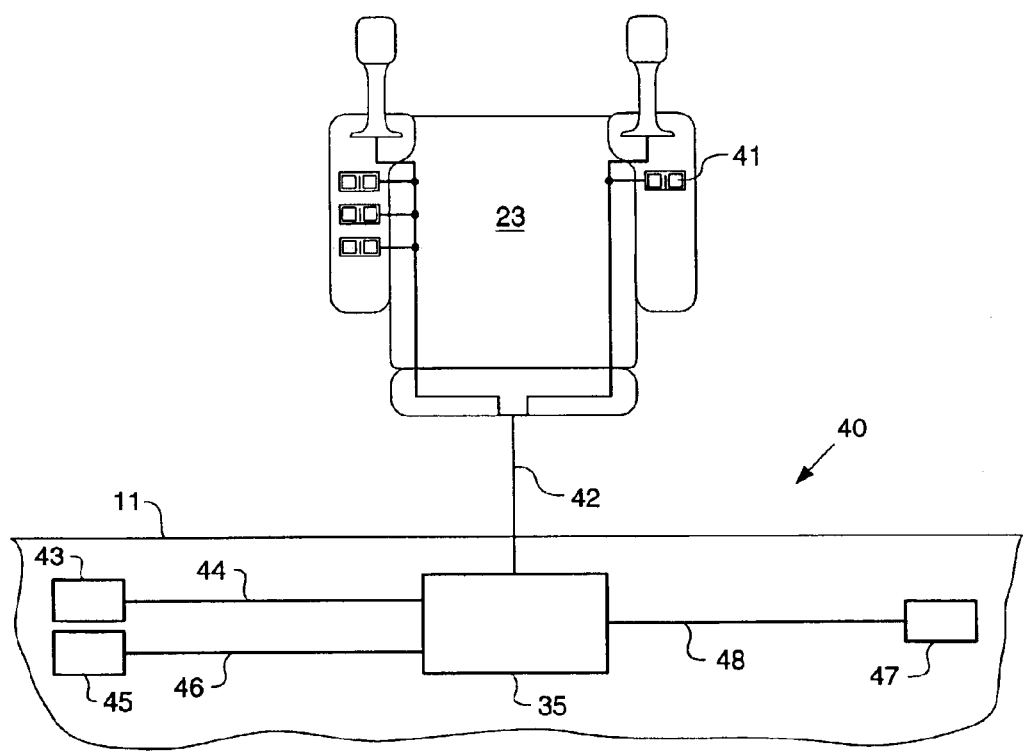
FIG. 3 is a schematic representation of the heating control system of FIG. 2.

Referring to FIG. 3, there is shown the heating control system 40 of the work machine 10 of FIG. 2. The electronic control module 35 is in communication with the operator heat controller 41 via a controller communication line 42. The operator heat controller 41 is moveable between a first position and a second position, but may also have additional positions to control other functions. The first position preferably being an activated position. The electronic control module 35 is also preferably in communication with an engine sensor 43 via an engine sensor communication line 44. The engine sensor 43 senses whether the engine 32 (FIG. 1) is active and communicates the data to the electronic control module 35. Those skilled in the art will appreciate that there are various methods of sensing whether the engine 32 is active, including but not limited to, sensing the oil pressure. The control system 40 preferably includes a coolant temperature sensor 45 that is in communication with the electronic control module 35 via a temperature sensor communication line 46. The coolant temperature sensor 45 is preferably positioned at any point within the heating system 30 where it can sense the temperature of the coolant that has passed over the engine 32 but has yet flowed through the heat exchanger 33. In addition, the control system 40 preferably includes a stored energy sensor 47 being in communication with the electronic control module 35 via an energy sensor communication line 48. The stored energy sensor 47 can sense the level of stored energy remaining in the battery 36, and thus, is preferably attached to the battery 36.

Figure 4:
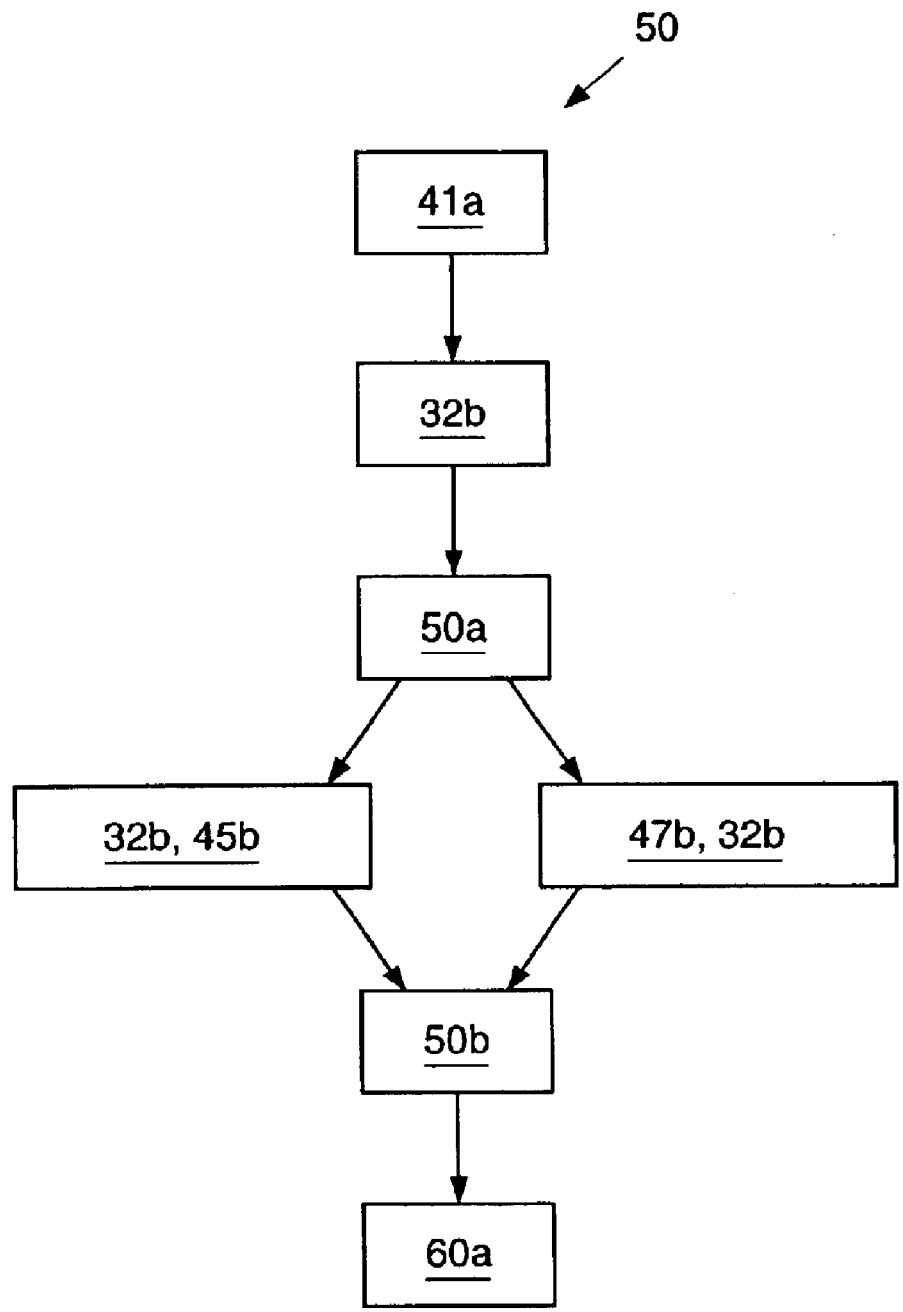
FIG. 4 is a flow chart of an operator station heating algorithm included within the heating control system of FIGS. 2 and 3.

Referring to FIG. 4, there is shown a flow chart of an operator's station heating algorithm 50 included within the heating control system 40 of the FIGS. 2 and 3. The electronic control module 35 includes the operator station heating algorithm 50. When the engine sensor 43 senses the engine 32 is inactive 32b and the operator heat controller 41 is in the first position 41a, an operator's station heating algorithm 50 will be operable to connect 50a the electronically-powered coolant pump 31 to the battery 36. If the coolant temperature sensor 45 senses a coolant temperature less than a predetermined coolant temperature 45b and/or the engine sensor 43 senses the engine 32 is inactive 32b, the operator's station heating algorithm 50 will be operable to disconnect 50b the electrically-powered coolant pump 31 from the battery 36 and activate the second heating system 60a, illustrated as the auxiliary power unit 61 connected to the electric heater 62. The predetermined coolant temperature is the coolant temperature required in order to maintain the operator's station 12 at a desired temperature. It should be appreciated that the predetermined coolant temperature can be based on a pre-selected desired operator's station temperature or a temperature set by the operator each time the operator heat controller 41 is activated. When the stored energy sensor 47 senses the stored energy level of the battery 36 is less than a predetermined level of stored energy 47b, the operator's station heating algorithm 50 will be operable to disconnect 50b the electrically-powered coolant pump 31 from the battery 36. Those skilled in the art will appreciate that the predetermined level of stored energy is a level of charge below which the battery 36 may have difficulty in subsequently activating and operating the work machine 10. Once the electrically-powered coolant pump 31 is disconnected from the battery 36, the operator's station heating algorithm 50 preferably will activate 60a the second heating system 60.

INDUSTRIAL APPLICABILITY

Referring to FIGS. 1–4, the operation of the present invention will be discussed as it applies to heating the operator station 12 of the over-the-road truck 10 when the engine 32 is inactive. However, it should be appreciated that the present invention operates similarly to heat the operator's station of any work machine, such as an off road work machine. During cold weather, the operator will need the operator's station 12 to be heated. When the engine 32 is activated, electrical energy can be supplied to the electrically-powered coolant pump 31 in a conventional manner. The electrically-powered coolant pump 31 will pump coolant from the source of coolant 34, and circulate the coolant over the engine 32. Because the engine 32 is active, it is performing work, which thereby produces heat. As the coolant passes over the engine 32, it will absorb heat from the engine 32 so the engine 32 does not overheat. The heated coolant is delivered to the heat exchanger 33, which will transfer the heat in the coolant to the air being blown into the operator's station 12. The air blower motor is also preferably electrically powered rather than being directly driven by the engine. The coolant will then be delivered to the source of coolant 34 for re-circulation through the fluid circuit 39.

However, there are situations in which the operator would like to continue heating the operator's station 12 after de-activation of the engine 32. For instance, during cold weather, the operator may need to heat the operator's station 12 when he is spending the night in the operator's station 12 on an over-the-night trucking job or, with off-road work machines, when the operator must complete paper work at the completion of a job. If the operator is in one of these situations, the operator can de-active the work machine 10 by de-activating the engine 32 and then move the operator heat controller 41 to the first position 41a. The fact that the operator heat controller 41 is in the first position 41a will be communicated to the electronic control module 35 via the controller communication line 42. The engine sensor 43 will sense that the engine 32 is in inactive and communication this data to the electronic control module 35. When the electronic control module 35 determines that the operator hand controller 41 is in the first position 41a and the engine 32 is inactive 32b, the operator's station heating algorithm 50 will be operable to connect 50a the battery 36 to the electrically-powered coolant pump 31. Thus, the electronic control module 35 can activate the battery 36 via the power source communication line 37, and battery 36 can supply electrical energy to the electrically-powered coolant pump 31.

The activated coolant pump 31 will pump fluid from the source of coolant 34 through the fluid circuit 39 to the engine 32. The coolant will then flow over at least a portion of the engine 32. Because the operator has recently de-activated the engine 32, the engine 32 should still be warm from the prior use. Those skilled in the art should appreciate that the temperature of the engine 32 depends on various factors, including but not limited to, the time lapse between the de-activation of the engine 32 and the enabling of the operator's station heating algorithm 50. It should also be appreciated that the fluid circuit 39 could include various warmed pieces of machinery other than the engine 32. For instance, the coolant could be passed over the warmed transmission. As the coolant passes over the warmed engine 32, the coolant will absorb some of the heat from the warmed engine 32. The warmed coolant will be delivered from the engine 32 to the heat exchanger 33. At a point along the fluid circuit 39, preferably between the engine 32 and the heat exchanger 33, the coolant temperature sensor 45 will sense the temperature of the coolant. The temperature of the coolant will be communicated to the electronic control module 35 via the temperature sensor communication line 46. If the electronic control module 35 determines that the coolant temperature 45b is less than the predetermined coolant temperature, the operator's station heating algorithm will be operable to disconnect 50b the electrically-controlled coolant pump 31 from the battery 36. It should be appreciated that the temperature of the coolant may be predetermined by sensing the temperature of the engine 32 and calculating the coolant temperature based on the sensed engine temperature prior to the enabling of the operator's station heating algorithm 50.

As long as the coolant temperature sensor 45 senses that the coolant temperature is greater than the predetermined coolant temperature, the coolant pump 31 will continue to be activated and the warmed coolant will flow through the heat exchanger 33. As the coolant flows through the heat exchanger 33, air is blown past the warmed coolant via an electrically powered blower. The heat of the coolant is transferred to the air, which is then blown into the operator's station 12. After the coolant flows through the heat exchanger 33, it is drained back to the source of coolant 34 for re-circulation through the heating system 30. Because the predetermined coolant temperature is the coolant temperature required to achieve the desired temperature of the operator's station 12, the operator's station 12 will remain at a heated temperature when the operator's station heating algorithm is operable to connect 50a the coolant pump 31 to the battery 36.

The stored energy sensor 47 will also be sensing the level of stored energy within the battery 36 and communicating such to the electronic control module 35 via the power source communication line 48. If the electronic control module 35 determines that the stored energy level of the battery 36 has fallen below the predetermined stored energy level, the operator's station heating algorithm will be operable to disconnect 50b the electrically-powered coolant pump 31 from the battery 36. Because the predetermined stored energy level is the level of energy that is needed to subsequently activate and operate the work machine 10 without difficulty, the electrically-powered coolant pump 31 can be operated without the operator being concerned with draining the energy from the battery 36. If the stored energy level of the battery 36 reaches the predetermines stored energy level and the coolant pump 31 is disconnected from the battery 36, the electronic control module 35 will preferably activate the second heating system 60. The auxiliary power unit 61 can provide electrically energy to the electric heater 62, and the electric heater 62 can warm the operator's station 12. Thus, the operator's station 12 will remain heated without any effort set forth by the operator.

The present invention is advantageous because it allows the operator to heat the operator's station 12 with the most efficiency while the engine 32 is inactive. The present invention conserves energy by, at least temporarily, transferring the heat that has previously been generated by the engine 31 to the operator's station 12 rather than create new heat by means of another heating system, such as the electric heater 62 or a fuel-fired heater. These other heating systems, such as the electric heater 62, generally require more energy to operate than the electrically-powered coolant pump 31. The present invention also limits fuel consumption and undesirable emissions. By powering the electrically-powered coolant pump 31 via the battery 36, it is unnecessary for the operator to activate the engine 32 in order to circulate the coolant and heat the operator's station 12. Thus, until the temperature of the engine 32, and thus the temperature of the coolant, falls below a temperature that will keep the operator's station 12 warmed, the operator does not need to idle the work machine 10 and consume fuel and increase undesirable emissions in order to heat the operator's station 12. The present invention adapts the heating system used when the engine 32 is active for use when the engine 32 is inactive. Therefore, the present invention does not require a significant increase in work machine components.

Moreover, the present invention is advantageous because it increases the comfort and convenience of the operator. For instance, during relatively brief stops, the operator may not need to exit from the operator's station 12 and into the cold weather in order to manually connect the work machine 10 to the auxiliary power unit 61. Rather, the operator must simply push the operator heat controller 41 positioned within the heated operator's station 12. In addition, the operator, when de-activating and exiting the work machine 10 for a relatively brief time period, may continue to heat the operator's station 12 in his absence without idling the engine 32. Thus, upon returning to the work machine 10, the operator can enter a heated operator's station 12 rather than waiting for the operator's station to resume its prior temperature.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A work machine comprising:
   an engine attached to a work machine body;
   an operator's station;
   a first heating system including an electrically-powered coolant pump and a power source;
   an operator heat controller being operable to connect the electrically-powered coolant pump to the power source when the engine is inactive; and
   a distinct second heating system that is operable to heat the operator's station when the first heating system is deactivated.

2. The work machine of claim 1 wherein the electrically-powered coolant pump is operable to cool the engine.

3. The work machine of claim 2 wherein the operator heat controller is in communication with an electronic control module that includes an operator station heating algorithm;
   the operator station heating algorithm being operable to connect the electrically-powered coolant pump to the power source when the operator heat controller is in an activated position and the engine is inactive.

4. The work machine of claim 3 including a coolant temperature sensor; and
   when the coolant temperature sensor senses the coolant temperature is less than a predetermined temperature, the operator station heating algorithm is operable to disconnect the electrically-powered coolant pump from the power source.

5. The work machine of claim 4 wherein the operator station heating algorithm being operable to activate the second heating system when the temperature coolant sensor senses the coolant temperature is less than the predetermined coolant temperature.

6. The work machine of claim 1 including an engine sensor in communication with the electronic control module.

7. The work machine of claim 1 including a stored energy sensor in communication with an electronic control module that includes an operator station heating algorithm; and
the operator station heating algorithm being operable to disconnect the electrically-powered coolant pump from the power source when the stored energy sensor senses a stored energy level of the power source is less than a predetermined level of stored energy.

8. The work machine of claim 1 wherein the power source includes a battery.

9. The work machine of claim 5 wherein the operator station heating algorithm being operable to disconnect the electrically-powered coolant pump from the power source when the a stored energy sensor senses the stored energy level is less than a predetermined level of stored energy;
   the power source including a battery; and
   the electronic control module being in communication with an engine sensor.

10. A method of heating the operator station of the work machine of claim 1, comprising the steps of:
    deactivating the engine;
    positioning the operator heat controller in an on position; and
    supplying electrical energy to the electrically powered coolant pump while the engine is inactive.

11. The method of claim 10 wherein the step of supplying includes a step of connecting the electrically-powered coolant pump to a power source.

12. The method of claim 11 including a step of monitoring a level of stored energy within the power source.

13. The method of claim 10 includes a step of disconnecting the supply of electrical energy to the electrically-powered coolant pump when a coolant temperature is less than a predetermined temperature.

14. The method of claim 13 includes a step of activating the second heating system when the coolant temperature is less than the predetermined temperature.

15. The work machine of claim 1 wherein the second heating system includes an electric heater.

16. The work machine of claim 15 including an electronic control module; and
    electric power being supplied to said electric heater via said electronic control module.

17. The work machine of claim 16 wherein the second heating system includes an auxiliary power unit.

18. The work machine of claim 17 wherein said auxiliary power unit includes a shore power hookup that is detached from the work machine.

19. The method of claim 14 wherein the step of activating a second heating system includes electrically connecting an electric heater to an auxiliary power unit.

20. The method of claim 19 wherein the electrically connecting step is accomplished via an electronic control module.

* * * * *